Sept. 26, 1933. J. A. SHAW 1,928,507
PROCESS FOR TREATING LIQUID CONTAINING TAR ACID
Original Filed Nov. 2, 1927
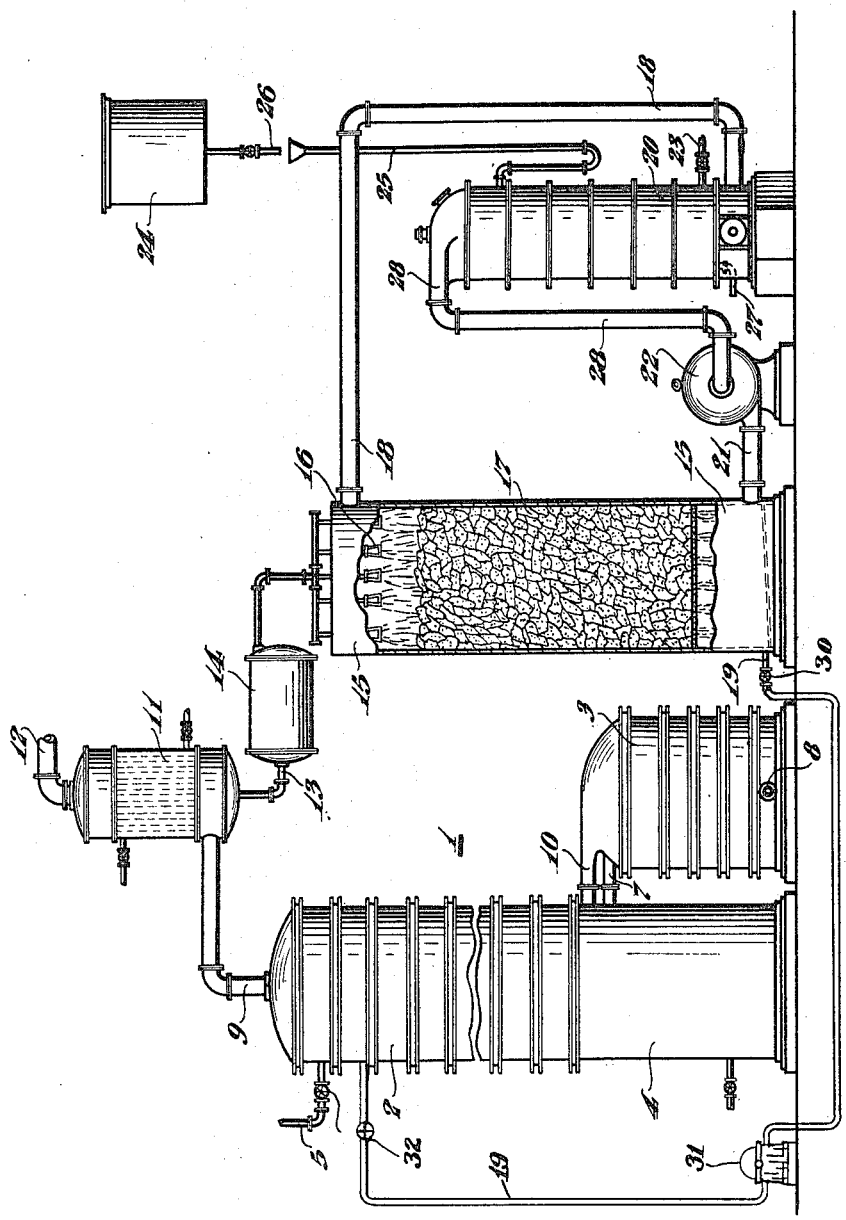
INVENTOR.
Joseph A. Shaw
BY Jesse R. Langley
ATTORNEY.

Patented Sept. 26, 1933

1,928,507

UNITED STATES PATENT OFFICE 1,928,507

PROCESS FOR TREATING LIQUID CONTAINING TAR ACID

Joseph A. Shaw, Pittsburgh, Pa., assignor to The Koppers Company of Delaware, a corporation of Delaware Original application November 2, 1927, Serial No. 230,570. Divided and this application September 28, 1928. Serial No. 308,966

5 Claims. (Cl. 260—154)

This invention relates to the treatment of liquids containing tar acids, such as phenol, cresol and analogous impurities.

My invention relates broadly to the removal of tar acids from any liquid that may contain them, but it has particular application to the treatment of condensates from gas derived from the various systems of coal carbonization and gasification, for example, gas liquor.

This application is a division of my application Serial No. 230,570, filed November 2, 1927.

An object of the present invention is to provide a process of and apparatus for accomplishing the removal of tar acids from liquid containing them.

A further object of my invention is to provide a process of and apparatus for accomplishing more complete removal of tar acids from liquid than has been possible by means of prior processes and apparatus.

Gas liquor is produced in cooling and condensing coal gas as produced in by-product coke ovens, gas retorts and the like. This liquor contains ammonia in two forms, (1) "free" (i. e. volatile) ammonia and (2) "fixed" ammonia, that must be decomposed prior to volatilization. Gas liquor also contains phenol, cresol, and analogous substances, herein designated as tar acids.

Gas liquor, after separation of such tar as may be entrained therewith, is ordinarily distilled in an ammonia still comprising a free ammonia still or "free section," a fixed ammonia still or "fixed section," and a lime leg. The free ammonia is driven off by steam in the free ammonia still, and the partially distilled liquor enters the lime leg, where it is mixed with milk of lime. The mixture of milk of lime and liquor is then treated with steam in the fixed ammonia still where the fixed ammonia of the liquor is decomposed and the ammonia driven off in vapor form.

The effluent or waste liquor from the fixed ammonia still contains principally various calcium salts formed in the decomposition of fixed ammonia, and is disposed of by draining it into a sewer or stream, or in any other feasible manner.

Tar acids contained in the gas liquor, if not volatilized and removed in the free ammonia still, are carried down with the gas liquor descending the still, and react with milk of lime to form calcium compounds. Such compounds are not volatile, and consequently escape from the still in the effluent or waste liquor.

Modern legislation concerning stream pollution is making it more and more difficult for gas manufacturers or others to dispose of ammonia still effluent containing tar acids by simply draining it into a sewer or stream. In the sterilization of water for drinking purposes by means of chlorine or chlorine compounds, if tar acids are present, chlorphenols and analogous substances are produced that are capable of imparting a disagreeable taste and odor to large amounts of water and which are on this account highly noxious in character.

It is thus desirable to accomplish substantially complete removal of tar acids either from the gas liquor itself or from the effluent or waste liquor, prior to disposal of the latter.

According to my invention, I provide for the substantially complete removal of tar acids from the gas liquor upon or before distillation of free ammonia therefrom.

I have found that substantially complete elimination of tar acids from gas liquor may be accomplished by heating the liquor to just below its boiling point and holding it at this temperature while blowing a gas, such as air or other inert gas through it. Under these conditions, the gas effects a volatilization of tar acids and is then treated for removal of tar acids therefrom, preferably with an alkali, for example a solution of sodium hydroxide. The gas is then recirculated for further use.

With respect to gas liquor, the process of my invention may be performed in several ways that are broadly divisible according to whether the gas liquor is treated before or after distillation of its fixed ammonia content. In either case, it is desirable to insure that substantially all of the tar acids present in the liquor are brought to the point of removal in order to prevent their escape into other parts of the system, entrapment in the waste liquor, and the like.

The gas liquor may be treated for removal of tar acids prior to introduction into the ammonia still if so desired, but in this instance the removal of tar acids is accomplished in conjunction with the distillation of free ammonia.

Moreover, my process may be variously performed in this respect according to whether it is to be carried out in conjunction with existing apparatus that should be modified as little as possible or with new apparatus that may be specially designed for this purpose, and with respect to various other considerations.

In the former case, i. e., when it is desired to utilize an existing ammonia still of the usual type, it is desirable to provide for the substantially complete removal of tar acids from the gas liquor in the ammonia still itself, but also to prevent escape of these impurities into certain other parts of the system for example, the ammonia saturator, the final cooler, or the like. In my process this end is attained without modification of existing structure except insofar as additional and separate apparatus may be required for the treatment of the tar acids.

In order that my invention may be clearly set forth and understood, I now describe, with reference to the accompanying drawing, a particular manner in which my invention may be embodied and performed. In this drawing, The single figure is an elevational view, partially in section, of apparatus for distilling gas liquor and for removing and recovering tar acids therefrom, parts being broken away.

Referring to the figure, the distillation of gas liquor or other ammoniacal liquor containing tar acids is conducted in an ammonia still unit 1 of the usual type. This unit is comprised of a free ammonia still 2 and a fixed ammonia still 3. The stills 2 and 3 are constituted of a plurality of superimposed bell-and-tray sections, the bell-and-tray sections of the free ammonia still 2 being supported upon a large section or "lime-leg" 4 that is adapted to contain milk of lime.

The liquor is admitted to the still 2 through an inlet conduit 5, the rate of flow being regulated by a valve 6. The gas liquor passes downward through the free ammonia still 2, traverses the lime leg 4 and passes through a conduit 7 into the fixed ammonia still 3. The limed liquor now passes down through the fixed ammonia still 3 and the effluent escapes through a drain 8.

Steam and milk of lime are admitted as necessary. During the progress of the gas liquor through the free ammonia still 2, the free ammonia is distilled off, escaping from the still 2 through a distillate pipe 9. The gas liquor, less its free ammonia content, now enters the lime leg 4 and is mixed with milk of lime, whereby the fixed ammonia is decomposed into free ammonia that is then distilled off in the still 3. The volatilized ammonia then passes through a pipe 10, through the still 2 and escapes through the pipe 9.

In the present instance, the distillation of the gas liquor is conducted in such manner as to liberate substantially all of the tar acids therefrom prior to contact of the liquor with milk of lime. This may be accomplished by maintaining the temperature in the top section of the free ammonia still 2 at a relatively high temperature, preferably about the boiling point of the liquor. As in other cases where steam distillation is employed, the volume of steam and gases may be a considerable factor in the removal of the tar acids. It is in this instance important to substantially completely remove tar acids from the gas liquor prior to contact with milk of lime in the lime leg 4, for the reason that these impurities, upon contact with lime, are rendered nonvolatile and will accordingly be carried out in this form in the effluent liquor removed through drain 8, which, as explained hereinabove, is to be avoided unless special provision is made to remove tar acids therefrom.

The ammonia gas, $H_2S$, $HCN$, $CO_2$, steam, and volatilized tar acids pass through the pipe 9 into a dephlegmator 11 where they are cooled to below the volatilization point of the tar acids. The remaining ammoniacal vapors pass through a line 12 to a condenser (not shown), or into the gas main at a point just prior to the entry of the gas into the ammonia saturator.

The dephlegmator 11 is maintained at such temperature as will effect a condensation of the tar acids but without condensing any more ammonia than is absolutely necessary. The actual temperature employed will vary somewhat and no specific temperature will apply under all conditions. Ordinarily, it is desirable to effect a condensation of only so much water as will serve to remove substantially all of the tar acids from the vapors. This amount will depend somewhat upon the construction of the dephlegmator. A temperature of about 60° C. has been found proper under certain conditions.

The liquid condensing in the dephlegmator 11 and containing substantially all of the tar acids originally present in the gas liquor runs by gravity through a pipe 13, into a heater 14, where it is heated, preferably indirectly, to a temperature just below its boiling point, and then enters a stripping tower 15 through a plurality of sprays 16 that serve to distribute the liquid evenly over the upper surface of a suitable quantity of contact material 17 within the tower 15. The contact material 17 may be any suitable material, such as coke, tile or the like, that is adapted to effect intimate contact between streams of liquid and gas flowing therethrough. The tower 15 is preferably insulated to prevent undue cooling of the liquid and gas within the same.

During the passage of the hot liquid downward through the contact material 17, it is exposed to a rising current of an inert gas, such as air which is substantially inert with respect to tar acids. By reason of the high temperature of the liquid and the scrubbing action of the gas, the tar acids present in the liquid are volatilized and carried off by the gas escaping with the gas from the tower 15 through a pipe 18. The liquid as free from tar acids as is necessary collects in the bottom of the tower 15 and is withdrawn through a drain pipe 19. This liquid, if it contains any considerable quantities of ammonia, may be redistilled, but this is usually unnecessary. For this purpose the pipe 19 may be connected to the still 2 and provided with a valve 30, a pump 31 and a valve 32 for controlling the flow of liquid from the tower 15 to the still 2.

In order to prevent unnecessary loss of ammonia and to prevent undue losses due to latent heat of vaporization, it is desirable to employ the gas used for removing tar acids from the liquid from the dephlegmator 11 in a closed cycle comprising recirculation through the tower 15 and a washer 20, wherein the gas is treated for removal of tar acids extracted from the liquid in the stripping tower 15.

To describe the gas cycle in more detail, the gas enters the tower 15 at the bottom thereof through a pipe 21 under action of a blower 22 and passes upward through the tower 15, emerging from the latter at the top thereof and passing through conduit 18 into the lower part of the washer 20.

In the present instance a Feld washer is employed for treating the gas. This washer 20 is of the usual construction and is provided with heating means, for example, a steam line 23. The washer 20 is supplied with a solution of caustic soda ($NaOH$) from a suitable reservoir 24 through a sealed pipe 25, wherein is situated a sight-feed 26 to facilitate regulation of flow. The gas and caustic solution pass through the washer 20 in counter-current and tar acids present in the gas are absorbed by the caustic solution as sodium compounds that are not volatile under these conditions and which are of valuable character. Preferably a concentrated solution of alkali is employed and the rate of flow of the solution is so regulated that the solution leaving the washer 20 through a drain pipe 27 is substantially saturated with respect to tar acids under these conditions. The gas throughout the cycle is kept warm enough to prevent undesirable condensation, i. e., just below the boiling point of the liquor, and is consequently saturated with water vapor, being thus in effect a mixture of gas and steam.

The rate of flow of the solution is further regulated according to the tar acid content of the gas emerging from the washer 20, which should be substantially nil.

This phenol-free gas passes out of the washer 20 through a pipe 28 and is drawn into the blower 22, whence it is forced through pipe 21 into the tower 15 for treatment of further quantities of liquid.

The above-described apparatus and process are particularly applicable to the recovery of tar acids from gas liquor in already existing distillation plants.

It will be seen that, according to my invention, substantially no tar acids are carried into the main gas stream or the condenser nor does the effluent liquor from the fixed ammonia still 3 contain any substantial amount of tar acids. Thus the object of the present invention is accomplished.

While I have described my invention hereinabove with respect to certain specific examples, it is not limited to such specific illustrative methods or apparatus but may be variously performed within the scope of the following claims.

I claim as my invention:

1. The process of treating gas liquor which comprises distilling said liquor, cooling thereby liberated vapors of ammonia and tar acid to such extent as to condense tar acid therefrom, and subjecting the condensate thereby obtained to contact with a substantially inert gas at a temperature not substantially below its boiling point for the removal of tar acid therefrom.

2. The process of treating gas liquor which comprises distilling said liquor cooling thereby liberated vapors of ammonia and tar acid to such extent as to condense tar acid therefrom, subjecting the condensate thereby obtained to contact with a substantially inert gas at a temperature not substantially below its boiling point for the removal of tar acid therefrom, removing the thereby tar acid laden gas from said liquid, subjecting it to contact with an agent effective to remove tar acid therefrom maintained at a temperature not lower than that of said condensate, and recirculating said gas for further contact with said condensate.

3. The process of treating gas liquor which comprises distilling said liquor, cooling thereby liberated vapors of ammonia and tar acid said vapors to such extent as to separate therefrom a condensate containing tar acid, and subjecting said condensate to contact with a substantially inert gas recirculated through a cycle comprising said contact stage and an absorption stage wherein said gas is brought into contact with an agent having absorbent properties with respect to tar acid but not with respect to ammonia.

4. The process of treating gas liquor which comprises distilling said liquor, cooling thereby liberated vapors of ammonia and tar acid said vapors to such extent as to separate therefrom a condensate containing tar acid, subjecting said condensate to contact with a substantially inert gas recirculated through a cycle comprising said contact stage and an absorption stage wherein said gas is brought into contact with an agent having absorbent properties with respect to tar acid but not with respect to ammonia, and finally re-distilling the condensate thereby freed from tar acid for the removal of ammonia contained therein.

5. Apparatus for treating gas liquor which comprises, in combination, a still adapted to receive said liquor and means for heating the same, a cooler adapted to receive vapors from said still, a gas and liquid contact device lying in the path of condensate liquor leaving said cooler, a second gas and liquid contact device adapted to receive a tar acid absorbent liquid, and means for recirculating a substantially inert gas through a cycle comprising said gas and liquid contact devices.

JOSEPH A. SHAW.